Patented Apr. 15, 1952

2,592,890

UNITED STATES PATENT OFFICE 2,592,890

AGENTS FOR COMBATING PESTS AND A METHOD FOR KILLING PESTS

Hans Gysin, Basle, Switzerland, assignor to J. R. Geigy A. G., Basle, Switzerland, a Swiss company No Drawing. Application November 18, 1949, Serial No. 128,247. In Switzerland November 16, 1948

12 Claims. (Cl. 167—30)

This invention relates to a new class of chemical compounds and to compositions and methods for utilizing the biological properties of said compounds.

The new class of chemical compounds consists of dihydroresorcinol esters of carbamic acids having the general formula

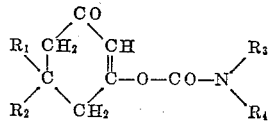

wherein $R_1$ and $R_2$ each represent hydrogen or a methyl group and $R_3$ and $R_4$ each represent the same or a different lower aliphatic hydrocarbon radical.

I have discovered that this new group of compounds is suitable for combating pests such as insects and other arthropods and that they have not only a lethal action but also a repellant effect on various troublesome insects.

I have discovered further that one compound of this new group of compounds, namely, 5.5-dimethyl-dihydroresorcinol-dimethyl-carbamate is unique in that it has a strikingly higher lethal effect upon insects than the other compounds of the group even including those closely related to it in structure. This new compound has a very active lethal effect against many insects, namely, e. g. flies (including flies which have shown resistance to the action of the well-known insecticide DDT), mosquitoes, gnats, ticks, plant lice, aphids, bed-bugs and ants. My invention includes this new compound 5.5-dimethyl-dihydroresorcinol-dimethyl-carbamate and pesticide compositions and methods based on the unique properties of this compound.

I have discovered further that one other compound of this new group of compounds, namely, 5.5 - dimethyl - dihydroresorcinol - diethyl - carbamate possesses unique properties as an insect repellent. While this compound is less lethal to insects that the corresponding dimethyl-carbamate, it has a repellent effect on blood-sucking insects, such as mosquitoes and gnats greater than that of the dimethyl-carbamate or of any other member of the group. My invention includes the new compound 5.5-dimethyl-dihydroresorcinol-diethyl-carbamate and insect repellents based on the unique properties of this compound.

These new compounds can be prepared by reacting a dihydroresorcinol of the general formula

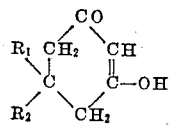

or its salts such as, for example, the alkali salts, with a carbamic acid derivative of the general formula

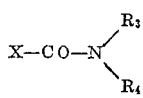

wherein X represents chlorine or bromine and $R_1$, $R_2$, $R_3$ and $R_4$ have the meanings defined hereinbefore. The reaction may be carried out in the presence or absence of inert solvents such as, for example, benzene, acetone, dioxan or ethyl acetate. When an uncombined dihydroresorcinol is used, it is advantageous to add an acid-binding agent.

The dihydroresorcinols which can be used as starting materials in making the new compounds are known. Dihydroresorcinol itself can be prepared, e. g., by partial catalytic hydrogenation of resorcinol in the presence of basic compounds. 5.5-dimethyl-dihydroresorcinol (dimedone) may conveniently be prepared by condensing mesityl oxide with malonic ester by Michael's method, followed by saponification and decarboxylising (Vorländer and Erig, A. 294, 314 (1897)). 5-methyl-dihydro-resorcinol can be prepared, for example, by condensing ethyl crotonate with ethyl aceto-acetate followed by saponification and decarboxylising (v. Schilling and Vorländer, A. 308, 192 (1899)).

Many examples of the carbamic acid halides of the general formula given above are known. They may be produced in very good yield by reacting secondary, lower molecular aliphatic amines with dihalide derivatives of carbonic acid. When they are produced in non-reactive solvents, the solutions thus obtained may be directly reacted with the dihydroresorcinols.

Examples of secondary, lower molecular aliphatic amines of the general formula

which may be used are: dimethylamine, diethylamine, methyl-ethylamine, di-n-propylamine, diallylamine, methyl-isopropylamine, ethyl-allylamine, di-n-butylamine, n-butyl-isobutylamine, methyl-n-butylamine, diamylamine.

The following examples serve further to illustrate and explain the manufacture of the new compounds. Parts are to be understood as parts by weight and temperatures are given in degrees centigrade.

EXAMPLE 1

140 parts of 5.5-dimethyl-dihydroresorcinol are dissolved in the calculated quantity of sodium carbonate solution and evaporated to dryness. The residue is extracted with absolute alcohol to free it from inorganic salts and after removal of the solvent the monosodium salt is left in a dry form which can be easily pulverized. The well pulverized salt is suspended in 800 parts of dioxan and 135 parts of diethyl-carbamyl chloride are added drop by drop to the suspension. The reaction mixture is then heated at 90–100° for 12 hours and the sodium chloride formed removed from the solution, while still warm, by filtering under suction. After the solvent has been distilled off, the residue is rectified by vacuum distillation.

The product has a boiling point of 131–134° at 0.3 mm. pressure and is a faintly yellowish liquid. It is 5.5-dimethyl-dihydroresorcinol-diethyl-carbamate having the formula

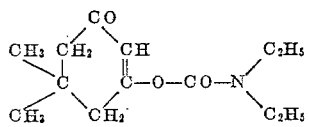

The product is 5.5-dimethyl-dihydroresorcinol-dimethyl-carbamate having the formula

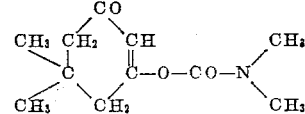

which has the following properties: Boiling point 11 mm., 170–180°.

In a high vacuum, the compound boils at 122–124° under 0.34 mm. pressure, crystallizing to form a yellowish-white crystalline mass with M. P. 45–46°. The compound is soluble in water up to 1% at 20° C. and freely soluble in organic solvents.

The following compounds can also be prepared by the methods described above:

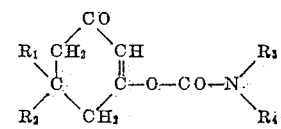

| No. | $R_1$ | $R_2$ | $R_3$ | $R_4$ | B. Pt. °C. | mm. pressure |
|---|---|---|---|---|---|---|
| 1 | H | H | —$CH_3$ | —$CH_3$ | 120–123 | 0.6 |
| 2 | H | H | —$CH_3$ | —$C_2H_5$ | 118–120 | 0.25 |
| 3 | H | H | —$C_2H_5$ | —$C_2H_5$ | 122–124 | 0.25 |
| 4 | H | H | —$CH_3$ | —$C_4H_9$ | 132–133 | 0.25 |
| 5 | H | H | —$C_4H_9$ | —$C_4H_9$ | 150 | 0.8 |
| 6 | H | H | —$CH_2$—$CH$=$CH_2$ | —$CH_2$—$CH$=$CH_2$ | 142–144 | 0.15 |
| 7 | —$CH_3$ | H | —$CH_3$ | —$CH_3$ | 112–114 | 0.2 |
| 8 | —$CH_3$ | H | —$CH_3$ | —$C_2H_5$ | 118 | 0.03 |
| 9 | —$CH_3$ | H | —$C_2H_5$ | —$C_2H_5$ | 136 | 0.7 |
| 10 | —$CH_3$ | H | —$C_4H_9$ | —$C_4H_9$ | 145–147 | 0.1 |
| 11 | —$CH_3$ | H | —$C_4H_9$(iso) | $C_4H_9$(iso) | 133–135 | 0.08 |
| 12 | —$CH_3$ | —$CH_3$ | —$CH_3$ | —$C_2H_5$ | 113–116 | 0.1 |
| 13 | —$CH_3$ | —$CH_3$ | —$CH_3$ | —$C_4H_9$ | 146–148 | 0.2 |
| 14 | —$CH_3$ | —$CH_3$ | —$C_3H_7$ | —$C_3H_7$ | 130 | 0.2 |
| 15 | —$CH_3$ | —$CH_3$ | —$C_4H_9$ | —$C_4H_9$ | 155–157 | 0.2 |
| 16 | —$CH_3$ | —$CH_3$ | $CH_2$—$CH$=$CH_2$ | —$CH_2$—$CH$=$CH_2$ | 142–144 | 0.1 |
| 17 | —$CH_3$ | —$CH_3$ | —$C_5H_{11}$ | —$C_5H_{11}$ | 165–167 | 0.25 |

EXAMPLE 2

70 parts of 5.5-dimethyl-dihydroresorcinol are mixed with 500 parts of ethyl acetate. Next 75 parts of anhydrous potassium carbonate and 68 parts of diethylcarbamyl chloride are added. The mixture is heated to boiling for 20 hours. The warm reaction mixture is next freed from inorganic salts and any unreacted potassium salt of 5.5-dimethyl-dihydroresorcinol which may be present, by filtration under suction. The diethyl-carbamate is then purified as described in Example 1.

EXAMPLE 3

140 parts of 5.5-dimethyl-dihydroresorcinol and 97 parts of finely pulverized potassium carbonate are suspended in 380 parts of benzene and the mixture stirred, while being kept refluxing. The water formed on neutralization is distilled off azeotropically. After the water has all been separated, the suspension is cooled to 60° and a solution of 108 parts of dimethyl-carbamyl chloride in 500 parts of benzene is added all at once. The resulting suspension is refluxed for 12 hours and any water which may form is removed from the system by azeotropic distillation. After cooling, the mixture is poured into 300 parts of water, the whole is thoroughly shaken up and the benzene layer removed. The aqueous solution is shaken up with benzene and the lumped benzene solutions are washed with water until neutral. The benzene is next distilled off under normal pressure and the residue fractionated in a water-jet vacuum or in a high vacuum. Yield, ca. 200 parts.

All these new compounds have, to some extent, both a lethal and a repellant effect on insects, but the lethal effect of 5.5-dimethyl-dihydroresorcinol-dimethyl-carbamate is strikingly greater than that of the other compounds, and the repellant effect of 5.5-dimethyl-dihydroresorcinol-diethyl-carbamate is greater than that of the other compounds.

My invention includes also pesticide and insect-repellent compositions and methods by means of which the biological properties of the new compounds may be made available and useful in a number of different fields.

EXAMPLE 4

*Dusting agent*

10 parts of 5.5-dimethyl-dihydroresorcinol-dimethyl-carbamate are ground together with 90 parts of talcum as finely as possible. The sticking power of the powder can be increased, if desired, by adding a mixture of 2 parts of a liquid fatty acid and 1 part of quenched lime. Such a dusting agent can be used, e. g., for combating pests in agriculture and in the household. It is particularly effective against flies, bed-bugs, plant lice and aphids.

Changes may be made in the dusting agent described without departing from my invention. Thus the talcum may be replaced by calcium carbonate in the form of whiting or ground limestone, kaolin, bole, bentonite, powdered magnesia, kieselguhr, boric acid, tricalcium phosphate, also powdered wood, powdered cork and other materials of a vegetable nature.

EXAMPLE 5

*Spraying agent (suspension) (wettable powder)*

50 parts of 5.5-dimethyl-dihydroresorcinol-dimethyl-carbamate, 40 parts of chalk, kieselguhr or bentonite, 2.5 parts of soda ash, 2.5 parts of casein and 5.0 parts of the sodium salt of dibutyl-naphthalene-sulphonic acid are ground up together as finely as possible. On stirring up with water, there is obtained a spraying agent excellently suited for combating ticks on animals or flies in stalls where animals are kept.

In the spraying agent which has been described, the casein may be replaced by another dispersing agent and the sodium salt of dibutyl-naphthalene-sulfonic acid may be replaced by another wetting agent without departing from my invention.

*Systemic insecticide*

The spraying agent described in Example 5 is also indicated for combating plant lice (aphids) and other sucking insects. It should be noted here that also those plant lice not directly reached by the spray itself are also killed as the active substance penetrates into the sap-stream of the plant and the sap-sucking insects are thereby destroyed. By special additions to the above spraying agent, it is possible to hinder the evaporation of the active substance and to increase the resistance to rainfall. In this way, it is possible to attain a certain residual effect against plant lice, as new amounts of active substance are constantly going into the sap-stream from the spray deposit. In this connection, for example, natural and synthetic resin, water glass, dextrin, starch, adhesives etc. can be used as additives.

EXAMPLE 6

*Spraying agent (solution)*

(a) 2 parts of 5.5-dimethyl-dihydrorescorcinol-dimethyl-carbamate are dissolved in 98 parts of kerosene.

(b) 2 parts of 5.5-dimethyl-dihydroresorcinol-dimethyl-carbamate and 3 parts of 1.1-bis-(p-chlorophenyl)-2.2.2-trichlorethane are dissolved together in 95 parts of kerosene.

Both solutions are excellently suited, for example, for combating flies in dwellings as well as in storage-depots and slaughterhouses.

In the sprays described, the kerosene may be replaced by similar mineral oil fractions or methyl naphthalene, xylenes and the like without departing from my invention.

By substituting kerosene by lower boiling solvents, such as trichlorethylene, tetrachlorethane or ethylene chloride, the spraying agent may be made suitable for spreading the active ingredient in the form of a mist.

EXAMPLE 7

*Spraying and impregnating agent*

20 parts of 5.5-dimethyl-dihydroresorcinol-dimethyl-carbamate are dissolved in 80 parts of isopropyl alcohol. The solution is miscible with water in all proportions, without any active substance separating out.

The solution obtained in this way can be used for plant protection, for combating animal and human ectoparasites, for impregnating textiles or as a space spray.

In the solution which has been described, the isopropyl alcohol may be replaced by other water-miscible solvents, such as lower alcohols or ketones.

EXAMPLE 8

*Fly spray*

2 parts of 5.5-dimetyhl-dihydroresorcinol-dimethyl-carbamate are dissolved in 2 parts of ethyl alcohol and diluted with 96 parts of water. The solution is valuable as a household fly spray, but may also be used for plant-protection, for combating animal and human ectoparasites, for impregnating textiles or as a space spray.

It is sometimes desirable to combine one of the new compounds with a bait or lure for insects to be killed. In this way a highly effective composition for destroying flies and other insects is produced, because it then also acts as stomach-poison. Examples of this composition are as follows:

EXAMPLE 9

*Fly spray*

1 part of 5.5-dimethyl-dihydroresorcinol-dimethyl-carbamate and 3 parts of sugar are dissolved in 96 parts of water. This solution may be used as a spray. Its effectiveness has been proved by the following test:

One quarter of a square meter of the wall of a room was thoroughly sprayed with the solution. Then 200 flies which resist the action of DDT were released in the room. They were soon attracted to the sprayed portion of the wall by the sugar contained in the solution. After half and hour, about 50% of the flies were incapable of flying and a few hours later all the flies were dead. The same result was obtained by releasing 200 more flies in the same room a few days later without repeating the spraying of the wall.

The solution may also be used to impregnate paper which then becomes effective as fly-paper. To produce the fly-paper, a sheet of filter paper is soaked in the solution and then dried. The effectiveness of this filter paper has been proved by the following test:

A piece of the filter paper (20 x 30 cm. in size) was placed at a suitable place in a room which contained 200 flies. After two hours all the flies were incapable of flying and a few hours later they were all dead. The fly-paper retained its activity during several days.

EXAMPLE 10

2 parts of 5.5-dimethyl-dihydroresorcinol-dimethyl-carbamate, 1 part of silica aerogel, 94.8 parts of sugar, 2 parts of carboxymethyl cellulose and 0.2 part of wetting agent are ground together.

The product can be used as a dusting agent whereby the sugar can partly be replaced by inert carriers. Diluted in water in a proportion of 1:3, it can be used as a spraying or coating agent. Besides exerting a contact action, these coverings are also a good stomach poison, especially against house flies.

EXAMPLE 11

2 parts of 5.5-dimethyl-dihydroresorcinol-dimethyl-carbamate, 1 part of silica aerogel, 97 parts of sugar are ground together and added to a mixture of 10 parts of malt extract and 50 parts of 33% homogenous gum arabic solution.

The viscose phase obtained can be pasted on fabric or impregnated in paper. The foils made therefrom have a good action against flies, especially when hung up in rooms.

EXAMPLE 12

Emulsion 20 parts of 5.5-dimethyl-dihydroresorcinol-dimethyl-carbamate, 25 parts of acetone, 20 parts of xylene and 35 parts of a higher molecular condensation product derived from a fatty alcohol together with ethylene oxide are dissolved together. On stirring up in water, an emulsion is obtained which is outstandingly active, e. g., against greenfly.

It should be noted here that also those plant lice not directly reached by the spray itself are also killed, as the active substance penetrates into the sap-stream of the plant and the sap-sucking insects are thereby destroyed.

If the emulsion, suitably diluted, is poured on the earth, then plant lice and other sucking insects on the plants which take in the substance through the roots can also be destroyed.

When plant stems which are attacked by plant lice are treated with a dilute emulsion, the plant lice are also destroyed by the active substance which is absorbed into the sap-stream.

In the emulsion above described, the condensation product which serves as an emulsifying agent may be replaced by a compound of a cation-active nature, such as quaternary ammonium compounds, as well as anion-active agents such as soap, soft soap, aliphatic mono-esters of sulfuric acid and aliphatic-aromatic sulfonic acids; and the acetone and xylene may be replaced by other solvents such as alcohols, cyclohexanone, benzene, toluene, tetrahydronapthalene, alkylated naphthalenes and phthalic acid esters, without departing from my invention.

EXAMPLE 13

Insect repellent (liquid)

20 parts of 5.5-dimethyl-dihydroresorcinol-diethyl-carbamate are dissolved in 80 parts of isopropyl alcohol. When applied to the skin or to articles of clothing or linen, this agent has a long-lasting insect-repellant effect.

Other water-soluble solvents may be substituted for the isopropyl alcohol in this composition.

EXAMPLE 14

Insect repellent (ointment)

20 parts of 5.5-dimethyl-dihydroresorcinol-diethyl-carbamate are dispersed in 80 parts of vaseline or other ointment base. When applied to the skin, the resulting ointment has a long-lasting repellant effect against mosquitos, flies and gnats.

EXAMPLE 15

20 parts of 5.5-dimethyl-dihydroresorcinol-dimethyl-carbamate are mixed with 25 parts of wheat flour, 52 parts of wood meal, 3 parts of potassium nitrate and 130 parts of water. The mass is shaped under pressure, e. g., in a spiral shape and dried.

When slowly burned, this composition has excellent insecticidal properties.

Other combustible powdered materials may be substituted for the wheat flour and wood meal in this composition.

In all the compositions which have been described, the active ingredient named may be replaced by any member of the aforesaid group of new compounds without departing from my invention, but the compositions thus produced are in general less effective than those containing the particular active ingredients specified in the descriptions of the compositions.

What I claim is:

1. The method of killing insects which comprises distributing a compound corresponding to the formula

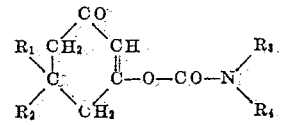

wherein $R_1$ and $R_2$ each represents a member selected from the group consisting of hydrogen and methyl and $R_3$ and $R_4$ each represents a lower aliphatic hydrocarbon radical to effect contact of said compound with the insects.

2. The method of killing insects which comprises distributing 5.5-dimethyl-dihydroresorcinol-dimethyl-carbamate to effect contact of said compound with the insects.

3. A fly-spray comprising as essential active ingredient 5.5-dimethyl-dihydroresorcinol-dimethyl-carbamate and a water-soluble solvent therefor.

4. A fly-spray comprising as essential active ingredient 5.5-dimethyl-dihydroresorcinol-dimethyl-carbamate and an insecticide spray oil.

5. A pesticidal solution for killing flies and other insects, comprising 5.5-dimethyl-dihydroresorcinol-dimethyl-carbamate and sugar dissolved in water.

6. A pesticidal dusting agent comprising a minor proportion of 5.5-dimethyl-dihydroresorcinol-dimethyl-carbamate and a major proportion of inert powder.

7. A pesticidal spray base comprising 5.5-dimethyl - dihydroresorcinol - dimethyl - carbamate, inert powder and an emulsifying agent.

8. A mosquito repellent comprising as essential active ingredient 5.5-dimethyl-dihydroresorcinol-diethyl-carbamate and isopropyl alcohol.

9. A compound corresponding to the formula

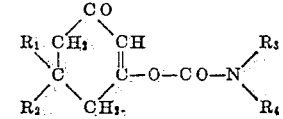

wherein $R_1$ and $R_2$ each represents a member selected from the group consisting of hydrogen and methyl and $R_3$ and $R_4$ each represents a lower aliphatic hydrocarbon radical.

10. 5.5-dimethyl - dihydroresorcinol - dimethyl-carbamate.

11. 5.5-dimethyl - dihydroresorcinol - diethyl - carbamate.

12. 5-methyl - dihydroresorcinol - dimethyl - carbamate.

HANS GYSIN.

REFERENCES CITED

The following references are of record in the file of this patent:

UNITED STATES PATENTS

| Number | Name | Date |
|---|---|---|
| 2,070,603 | Kilgore | Feb. 16, 1937 |

(Other references on following page)

OTHER REFERENCES

Klingenfuss, Chemical Abstracts 31, column 2588 (1937).

Eddy et al., "Further Tests . . . ," Chemical Abstracts, volume 41, columns 3575 to 3577 (1947).

OSRD, Insect Control Committee Report No. 28, Interim Report No. O-94, May 18, 1945 (publication date August 1, 1947). Pages 18, 23, 28 (2 entries), 39, O-6185 N-4(1-diethylaminopentyl) urethane, O-553 urethane, O-2559 methylene bis-(dimethyldihydroresorcinol), O-2560 benzylidene bis-(dimethyldihydroresorcinol), and O-6409 N,N-dicyclohexyl carbamic acid, methyl ester, respectively, considered particularly pertinent.